(12) United States Patent
    Shibata

(10) Patent No.: US 9,811,891 B2
(45) Date of Patent: Nov. 7, 2017

(54) IMAGE SHAKE CORRECTION DEVICE, OPTICAL APPARATUS, IMAGING APPARATUS, AND CONTROL METHOD

(71) Applicant: CANON KABUSHIKI KAISHA, Tokyo (JP)

(72) Inventor: Masahiro Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 15/067,863

(22) Filed: Mar. 11, 2016

(65) Prior Publication Data

US 2016/0269637 A1    Sep. 15, 2016

(30) Foreign Application Priority Data

Mar. 13, 2015  (JP) ................... 2015-050179

(51) Int. Cl.
    *H04N 5/232*    (2006.01)
    *G06T 5/20*     (2006.01)
    *H04N 5/14*     (2006.01)
    *G06T 5/00*     (2006.01)

(52) U.S. Cl.
    CPC .............. *G06T 5/20* (2013.01); *G06T 5/003* (2013.01); *H04N 5/145* (2013.01); *H04N 5/23248* (2013.01); *H04N 5/23258* (2013.01); *H04N 5/23261* (2013.01); *H04N 5/23287* (2013.01); *G06T 2207/20008* (2013.01); *G06T 2207/20201* (2013.01)

(58) Field of Classification Search
    CPC .............. H04N 5/23248; H04N 5/145; H04N 5/23251; H04N 5/23258; H04N 5/23287; H04N 5/23261; G06T 5/20
    See application file for complete search history.

(56) References Cited

U.S. PATENT DOCUMENTS 8,310,552  B2    11/2012  Noguchi
2002/0054213  A1*  5/2002  Kawahara .......... H04N 5/23248
                                                 348/207.99
2003/0147636  A1*  8/2003  Yamazaki .......... H04N 5/23248
                                                 396/55

(Continued)

FOREIGN PATENT DOCUMENTS

JP    2008-283443 A    11/2008
JP    2009-244853 A    10/2009

*Primary Examiner* — Abdelaaziz Tissire
(74) *Attorney, Agent, or Firm* — Cowan, Liebowitz & Latman, P.C.

(57) ABSTRACT

There is provided with an image shake correction device that controls an image correction unit and corrects an image shake of a captured image. The image shake correction device calculates a first correction amount to be used for correcting the image shake while shooting moving images and a second correction amount to be used for correcting the image shake while shooting still images based on a shake detection signal. The image shake correction device selects the correction amount to be used for correcting the image shake from either the first correction amount or the second correction amount and executes a control that updates an intermediate calculation value of the calculation unit corresponding to the correction amount that has not been selected from either the first calculation unit or the second calculation unit, with a value of the correction amount that has been selected.

11 Claims, 7 Drawing Sheets

(56) References Cited

U.S. PATENT DOCUMENTS

| | | | | |
|---|---|---|---|---|
| 2009/0231444 A1* | 9/2009 | Shibata | ............ | H04N 5/145 |
| | | | | 348/208.1 |
| 2009/0231452 A1* | 9/2009 | Noguchi | ............ | G03B 17/00 |
| | | | | 348/208.11 |
| 2011/0115929 A1* | 5/2011 | Noguchi | ............ | G03B 5/00 |
| | | | | 348/208.4 |
| 2012/0092511 A1* | 4/2012 | Wakamatsu | ...... | G02B 27/646 |
| | | | | 348/208.2 |
| 2012/0207457 A1* | 8/2012 | Miyasako | ........... | G03B 5/00 |
| | | | | 396/55 |
| 2012/0315025 A1* | 12/2012 | Wakamatsu | ..... | H04N 5/23248 |
| | | | | 396/55 |
| 2013/0195434 A1* | 8/2013 | Sakurai | ............ | G02B 27/646 |
| | | | | 396/55 |
| 2015/0309329 A1* | 10/2015 | Shibata | ............ | H04N 5/23258 |
| | | | | 359/557 |

\* cited by examiner

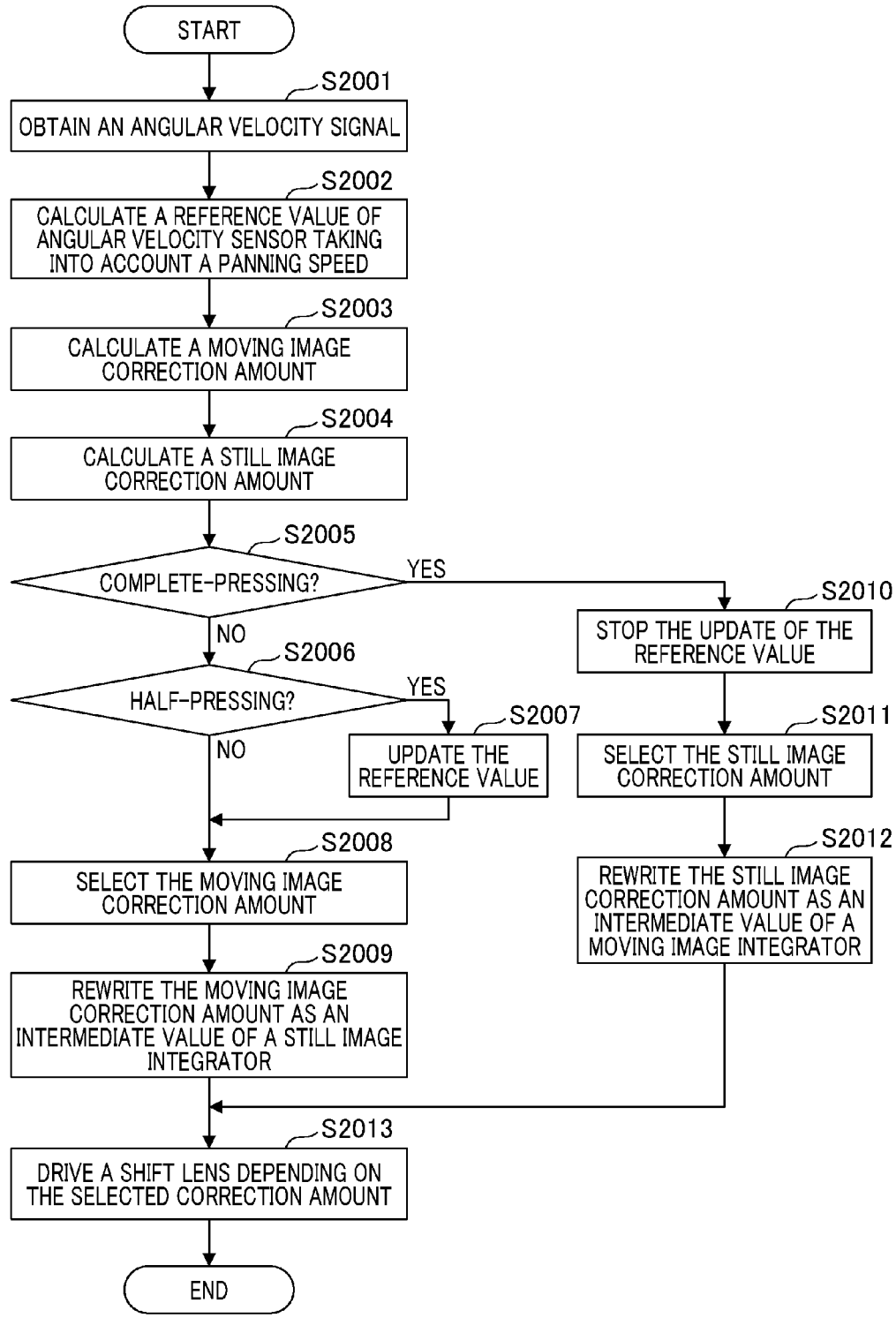

IMAGE SHAKE CORRECTION DEVICE, OPTICAL APPARATUS, IMAGING APPARATUS, AND CONTROL METHOD

BACKGROUND OF THE INVENTION

Field of the Invention

The present invention relates to an image shake correction device, an optical apparatus, an imaging apparatus, and a control method.

Description of the Related Art

An optical shake correction method and an electronic shake correction method have been proposed as methods that correct the shaking of a captured image (image shake) caused by shaking applied from the outside to an imaging apparatus, for example, a camera or a video. In the optical shake correction method, a lens and an imaging element are driven and the image shake is optically corrected. In the electronic shake correction method, a extraction position and the like of an image obtained by photoelectrically converting light that has been input to an imaging element is changed and the image shake is corrected.

In recent years, with the spread of the imaging apparatuses including a camera or a video and with the change of its manner of use, the demand for an imaging apparatus that enables simultaneously shooting moving images and still images by single apparatus is increasing. However, while the moving image has an image representation in which a change with the passage of time of the image is displayed, the still image has an image representation in which an image at a specific moment is extracted. Due to such differences in the image representation, there are many differences between the shooting of moving images and the shooting of still images in the control while shooting by a camera, for example, hand shake correction (image stabilizer: IS), auto focus (AF), and exposure control (automatic exposure: AE) while shooting by a camera. For example, with regard to shake correction control, in the shooting of moving images, the continuity between frames, in other words, smoothness of the motion with the passage of time, is more important even if motion blur of the moving image is present in the image. In contrast, the shooting of still images provides an image that captures a specific moment and needs sharpness without blur in the main subject.

Thus, while shooting moving images, a high-pass filter (HPF) is applied to a shake signal that has been detected and a low frequency component is removed, and as a result, a situation in which a shake correction unit reaches a limiter on control and correction is made impossible is avoided as much as possible even if slow shaking remains. In contrast, during the exposure in still image shooting, the high-pass filter (HPF) is not applied to the shake signal that has been detected and the correction of all shake components including the low frequency component is allowed, and the improvement of the performance has been attempted.

In this context, as a method of detecting shake signals, although there is a method that detects vibrations of a camera by using a sensor that detects acceleration, angular acceleration, an angular velocity, and angular displacement, and the like, a gyro sensor that detects the angular velocity is commonly used as a sensor for detecting the vibrations of camera. However, the gyro sensor is largely affected by DC offset and drift due to a temperature change, and thus a mechanism for removing the offset component from a reference value is necessary. Although this offset component can be removed if the HPF is applied to the vibration signal from the gyro sensor, it cannot be removed if the HPF is not applied, causing a deterioration in the anti-vibration performance due to the deviation of the reference value.

Japanese Patent Application Laid-Open Publication No. 2009-244853 discloses an imaging apparatus in which an intermediate value held as a calculation result for each of control samples of a digital high-pass filter (HPF) and a digital offset to be added to a shake output are changed, and the offset component included in the shake output is removed. Additionally, Japanese Patent Application Laid-Open Publication No. 2008-283443 discloses an imaging apparatus in which switch setting whether or not HPF processing is performed in accordance with the exposure time, and thus the influence on an accuracy of the image shake correction by HPF processing is reduced.

The imaging apparatus disclosed in the Japanese Patent Application Laid-Open Publication No. 2008-283443 has a the following inconvenience because a motion while switching the HPF is not taken into account. Specifically, when the HPF is not applied while shooting moving images (for example, when the EVF is used), the low-frequency component is also corrected, causing a difficulty in the framing, and in addition to that, causing a correction unit such as a shift lens to easily hit the limiter (correction end). Additionally, if a path of the shake signal processing is divided into two, specifically, the presence/absence of the HPF, between the exposure of still images and the shooting of moving images, the signal causes a discontinuity while switching the HPF, and thereby the correction unit moves significantly.

SUMMARY OF THE INVENTION

The present invention provides an image shake correction device that ensures that discontinuity does not occur in the control of a shake correction unit even if a shake signal processing method is switched between the shooting of moving images and the shooting of still images.

An image shake correction device according to an embodiment of the present invention is an image shake correcting device that controls an image shake correction unit and corrects an image shake of a captured image. The image shake correction device comprises a first calculation unit configured to calculate a first correction amount used for correcting the image shake while shooting moving images based on a shake detection signal; a second calculation unit configured to calculate a second correction amount used for correcting the image shake while shooting still images based on the shake detection signal, and a control unit configured to select a correction amount to be used for correcting the image shake from either the first correction amount or the second correction amount and execute a control that updates an intermediate calculation value of the calculation unit corresponding to the correction amount that has not been selected from either the first calculation unit or the second calculation unit, with a value of the correction amount that has been selected.

Further features of the present invention will become apparent from the following description of exemplary embodiments (with reference to the attached drawings).

BRIEF DESCRIPTION OF THE DRAWINGS

FIG. 7 is a diagram that explains the calculation processing of a correction amount for moving images and still images.

DESCRIPTION OF THE EMBODIMENTS

First Embodiment

Figure 1:
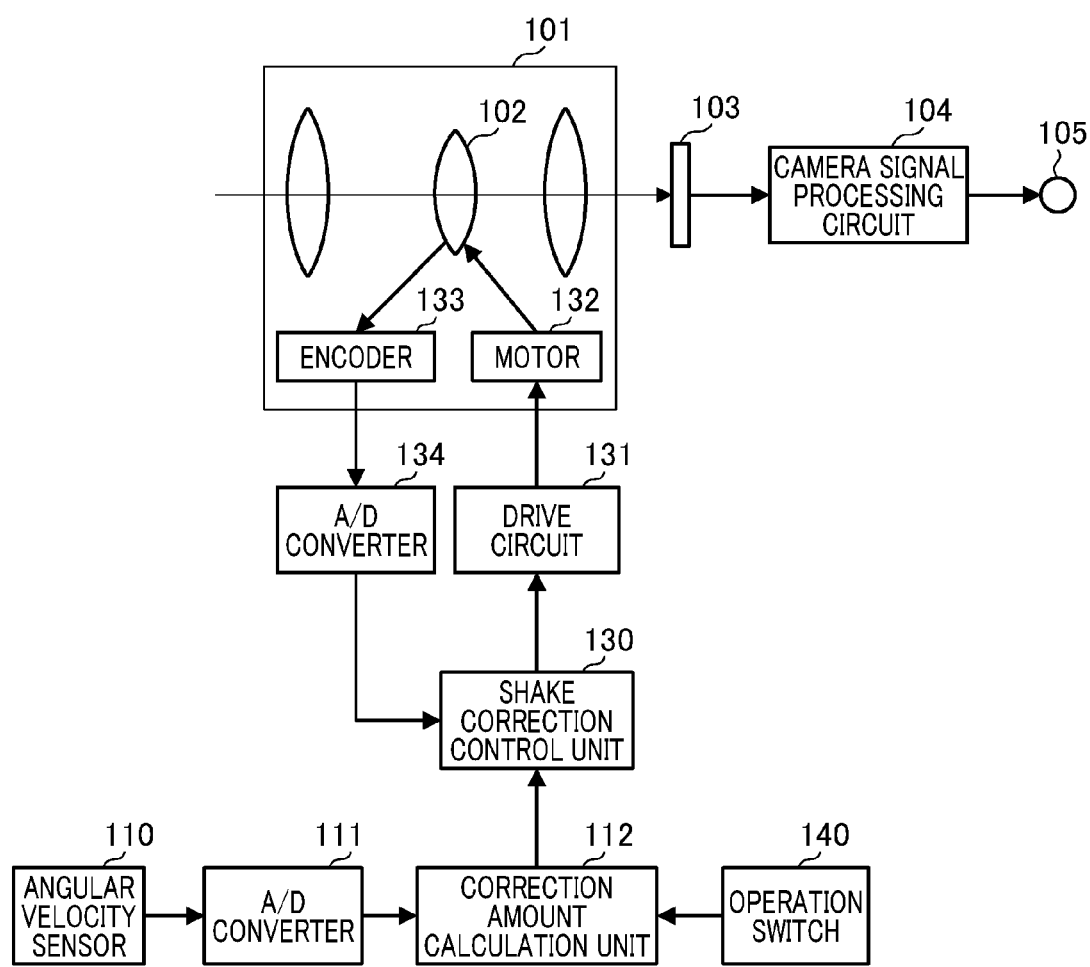
FIG. 1 illustrates a configuration example of the present embodiment.

FIG. 1 illustrates a configuration example of the present embodiment. An imaging apparatus shown in FIG. 1 is an example of optical apparatuses including an image shake correction device of the present embodiment. In this example, the imaging apparatus is a digital video camera, and the present invention is applicable to any imaging apparatuses having a moving image shooting function and a still image shooting function, and an optical apparatus mounted on this imaging apparatus. Additionally, the imaging apparatus of the present embodiment includes an apparatus in which an imaging apparatus is incorporated or built-in, for example, a mobile phone with a camera, a game machine, and a personal computer.

In FIG. 1, reference number 101 is a lens group configured of a plurality of lenses in a photographic optical system. Reference number 102 is a correction optical system that functions as a shake correction unit that corrects shaking of a captured image (image shake). Specifically, the correction optical system 102 is a shake correction lens group (shift lens) that moves on a plane perpendicular to the optical axis and corrects shaking. Reference number 103 is an imaging element that photoelectrically converts an image formed by the imaging optical system 101. Reference number 104 is a camera signal processing circuit that performs conversion processing of the imaging signal that has been photoelectrically converted by the imaging element 103 into, for example, a standard video signal. The camera signal processing circuit 104 includes an analog signal processing circuit and a digital signal processing circuit. The analog signal processing circuit performs predetermined processing on the signal obtained by the imaging element 103 and generates an analog imaging signal. The analog signal processing circuit has, for example, a CDS (co-related double sampling) circuit, an AGC (Automatic Gain Control) circuit, and the like. The digital signal processing circuit converts an analog image signal into a digital signal by an A/D converter, and generates a digital image signal on which predetermined signal processing, for example, gamma correction, white balance, and the like is performed.

Reference number 105 is a standard output signal terminal that was obtained from the camera signal processing circuit 104. The standard output signal terminal 105 outputs an image that has been captured as a standard video signal. The standard video signal output from the standard output signal terminal 105 may be connected to an external monitor, or may be output-displayed on a display device provided in the imaging apparatus (a liquid crystal panel or a viewfinder). Additionally, it is also possible that the video signal is converted into a predetermined recording format and recorded in a recording medium (for example, a memory card, a hard disk, a DVD, a magnetic tape).

Reference number 110 is an angular velocity sensor that detects shaking applied to the imaging apparatus. The angular velocity sensor 110 is configured by a vibrating gyroscope and the like, and detects an angular velocity of the shaking of the imaging apparatus due to, for example, hand shaking, and outputs an electric signal. In the angular velocity sensor 110, two angular velocity sensors are situated in two axial directions of, for example, a horizontal rotation axis (yaw) and a vertical rotation axis (pitch) so as to form detection axes that are orthogonal to each other on one plane perpendicular to the optical axis. Subsequently, the angular velocity sensor 110 separately calculates a correction amount for each axis that has been detected and controls the correction optical system 102 in the two axial directions, the horizontal direction and vertical directions. The calculation of the correction amount of the horizontal rotation axis (yaw) and the vertical rotation axis (pitch) and the control of the correction optical system can be realized by using the same processing for both axes, and thus, hereinafter, a description will be given of only one of the axes.

Reference number 111 is an A/D converter for inputting the output signal of the angular velocity sensor into a correction amount calculation unit 112. Reference number 112 is a correction amount calculation unit that calculates a correction amount of the correction optical system 102 based on the digital signal that has been obtained from the output signal of the angular velocity sensor 110 through the A/D converter 111. The image shake correction device is realized by a function of the correction amount calculation unit 112. Additionally, the correction amount calculation unit 112 is realized by a function of a microcomputer included in the imaging apparatus. Note that if the angular velocity sensor 110 is a digital sensor, the A/D converter 111 is not required and digital data may be obtained by a communication with the microcomputer. A detailed description will be given of the correction amount calculation unit 112 below.

Reference number 140 is an operation switch that is used for operating the shooting of still images by a photographer. The operation switch 140 is configured so that the first switch (SW1) and the second switch (SW2) are sequentially ON, depending on the pressing amount. When the operation switch 140 is pressed halfway (half-pressing), the first switch is ON, and when it is pressed all the way down (complete-pressing), the second switch is ON. When the first switch is ON, a focus lens included in the lens group 101 is driven, focus adjustment is executed, an aperture-shutter unit is driven, and the proper exposure is set. Further, when the second switch is ON, the exposure to the image element 103 is performed and the shooting of still images is performed.

Reference numbers 130 through 134 are correction control blocks for controlling the correction optical system (shift lens) 102. Reference number 133 is a shift encoder and detects the position of the shift lens 102. The shift encoder 133 is, for example, a Hall sensor. The output value of the shift encoder 133 is input to a shake correction control unit 130 via an A/D converter 134. Reference number 130 is a shake correction control unit. The shake correction control unit 130 calculates a control amount of the shift lens based on a difference between a correction amount (target value) from the correction amount calculation unit 112 and the current position of the shift lens 102 obtained from the shift encoder 133, and outputs a control signal. Here, signal processing using an amplifier and a phase compensation filter is performed with reference to the differential data, and a control amount is calculated. Reference number 131 is a shift lens drive circuit. The shift lens drive circuit 131 is a drive circuit that receives a control signal output from the shake correction control unit 130 with, for example, PWM, and outputs a drive waveform to a motor 132. Reference number 132 is a motor. The motor 132 is, for example, a voice coil motor that drives the shift lens 102.

Figure 2:
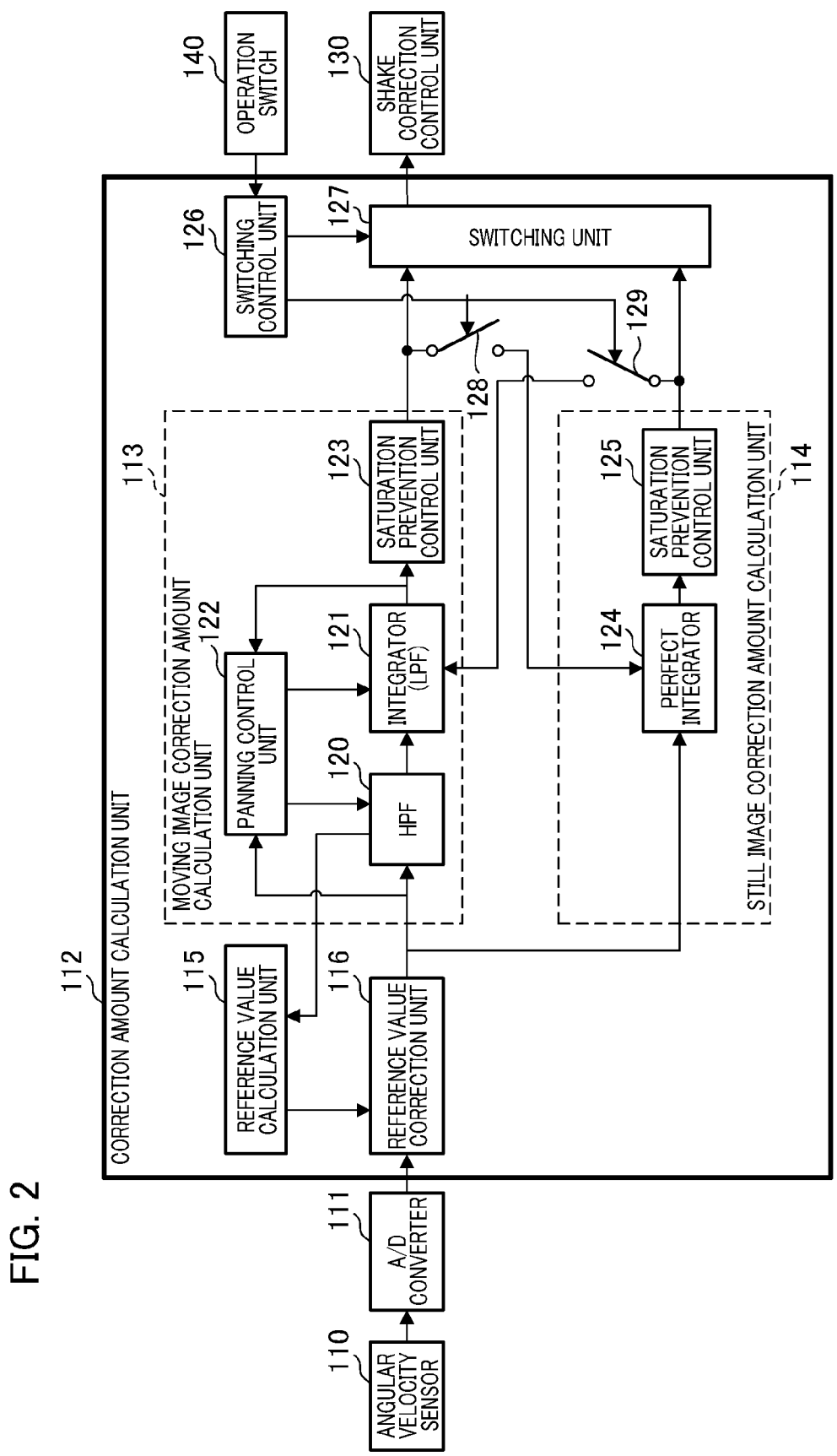
FIG. 2 illustrates a configuration of a correction amount calculation unit.

FIG. 2 illustrates a configuration of a correction amount calculation unit. The angular velocity sensor 110 that provides an input signal to the correction amount calculation unit 112, the A/D converter 111, the operation switch 140, and the shake correction control unit 130 that receives the output signal from the correction amount calculation unit 112 are similar to those shown in FIG. 1.

The correction amount calculation unit 112 obtains a shake detection signal from the A/D converter 111. The shake detection signal is a signal in which the angular velocity signal of the shaking that has been detected by the angular velocity sensor 110 is digitally converted.

A reference value calculation unit 115 calculates and sets a reference value of the digitally converted angular velocity signal based on the calculation result for a high-pass filter (HPF) 120, that is, an intermediate value of the filter calculation. The reference value of the angular velocity signal is an output value of the angular velocity signal in a state in which no shaking occurs. A reference value correction unit 116 subtracts the reference value calculated in the reference value calculation unit 115 from the angular velocity signal obtained from the A/D converter 111, and then removes an offset component caused by the influence of DC offset and drift due to a temperature change of the angular velocity sensor 110 and the like. Accordingly, the angular velocity signal is corrected to an output signal that is constituted only of a shake component. Specifically, the reference value calculation unit 115 functions as a third calculation unit that calculates a reference value of the shake detection signal, and the reference value correction unit 116 functions as a signal correction unit that corrects the shake detection signal by using the reference value.

A moving image correction amount calculation unit 113 is provided with the HPF 120 through a saturation prevention control unit 123, and calculates a correction target value for performing a shake correction suitable for the shooting of moving images. Specifically, the moving image correction amount calculation unit 113 functions as a first calculation unit that calculates a first correction amount used for correcting an image shake during the shooting of moving images, based on the output signal from the reference value correction unit 116 (shake detection signal). The HPF 120 has a function that allows varying its frequency characteristic, blocks a low frequency component included in the obtained angular velocity signal, and outputs the signal. The HPF 120 removes the DC offset and drift component due to a temperature change, which is a characteristic of the angular velocity sensor 110, and improves the accuracy of the reference value calculation unit 115. Moreover, when the panning operation is detected, the HPF 120 increases a cutoff frequency, removes a low frequency component caused by the panning operation, and increases the shake correction performance. Note that the panning operation is an example of shooting direction change operation, and the present invention is also applicable to the shooting direction change operations other than the panning operation (for example, tilting operation).

An integrator 121 performs time integration on the angular speed signal output from the HPF 120 and obtains an angular displacement amount. Note that the integrator 121 performs incomplete integration and it is possible to optionally change the time constant. A panning control unit 122 determines whether or not the imaging apparatus is in a panning state, according to an angular velocity signal obtained from the reference value correction unit 116 and the magnitude of the angular displacement amount obtained from the integrator 121. Subsequently, depending on the determination result, the panning control unit 122 changes the cutoff frequency of the HPF 120 if the angular velocity signal is large, and removes the low-frequency component due to the panning operation. When the angular displacement amount has increased, the panning control unit 122 changes the time constant of the integrator 121 so as to hardly reach the correction end.

The saturation prevention control unit 123 provides a limit on the control amount generated by the integrator 121 so as not to cause the shift lens 102 to hit a mechanical movable end. For example, the saturation prevention control unit 123 outputs a value produced by limiting the output from the integrator 121 as a final correction target position so as not to cause the control amount of the correction optical system to exceed a predetermined value (hereinafter, referred to as a "limiter").

A still image correction amount calculation unit 114 includes an integrator 124 and a saturation prevention control unit 125, and calculates a correction target value for performing a shake correction suitable for the shooting of still images. Specifically, the still image correction amount calculation unit 114 functions as a second calculation unit that calculates a second correction amount used for correcting an image shake during the shooting of still images, based on the output signal from the reference value correction unit 116 (shake detection signal). The integrator 124 performs time integration on an angular velocity signal obtained from the reference value correction unit 116 not via the HPF 120, and obtains an angular displacement amount. Note that the integrator 124 performs complete integration, and the angular displacement amount including a low frequency component is calculated. The saturation prevention control unit 125 has a function that is the same as that of the saturation prevention control unit 123 in the moving image correction amount calculation unit 113 described above.

The moving image correction amount calculation unit 113 is different from the still image correction amount calculation unit 114 in that it includes the HPF 120 and the panning control unit 122. In the moving image shooting, camerawork operation, including panning and tilting, is performed, and if the motion due to the camera operation is regarded as shaking and correction is performed, the angle of view change, which is different from the photographer's intention in the camera work, occurs. Additionally, the quick approach of the correction optical system 102 to the limiter causes a situation in which the subsequent shaking is corrected with difficulty. The moving image correction amount calculation unit 113 includes the panning control unit 122 and the HPF 120 so as not to forcibly correct the motion of the panning or tilting if panning or tilting is performed, and cuts a low frequency component of the shake signal and changes the correction target value.

In contrast, in the shooting of still images, the goal is to capture an image at a specific moment in a temporal change, and no shaking is desirable at the moment, that is, the period of one frame during which an image has been captured. Therefore, during the shooting of still images, a mechanism in which a correction target value is calculated so as to enable correcting the shake signal including the low frequency component, without calculation processing of the HPF 120, is used.

A switching control unit 126 controls the switching of the correction amount based on ON information of the first switch (SW1) and the second switch (SW2), which is obtained in accordance with the half-pressing/complete-pressing operation situation of the operation switch 140. A switching unit 127 selects and switches the correction amount to be used, based on the information of the switching control unit 126, with regard to the moving image correction amount input from the moving image correction amount calculation unit 113 and the still image correction amount input from the still image correction amount calculation unit 114. Subsequently, the switching unit 127 outputs any one of the correction amounts that have been selected to the shake correction control unit 130.

Additionally, the switching control unit 126 switches a switch 128 and a switch 129 ON or OFF based on the information about whether or not the SW2 is ON by the operation switch 140, that is, information about whether or not the exposure is being performed. In this example, the switching control unit 126 turns the switch 128 ON and turns the switch 129 OFF while the moving image correction amount serves as the correction target value in a state in which SW2 is OFF, that is, in a state in which the still image is not being exposed. Additionally, the switching control unit 126 turns the switch 129 ON and turns the switch 128 OFF while the still image correction amount serves as the correction target value in a state in which the SW2 is ON, that is, in a state in which the still image is being exposed. Thus, when the switch 128 is ON, the moving image correction target value is rewritten as a filter calculation intermediate value with respect to the perfect integrator 124 in the still image correction amount calculation unit 114. Additionally, when the switch 129 is ON, the still image correction target value is rewritten as a filter calculation intermediate value with respect to the integrator 121 in the moving image correction amount calculation unit 113. That is, the switching control unit 126 selects the correction amount used for correcting image shake from either of the moving image correction amount or the still image correction amount, and performs the control below. The switching control unit 126 updates the intermediate calculation value of the calculation unit that corresponds to the correction amount that has not been selected from either of the moving image correction amount calculation unit 113 or the still image correction amount calculation unit 114, with the use of the selected correction amount.

Figure 3:
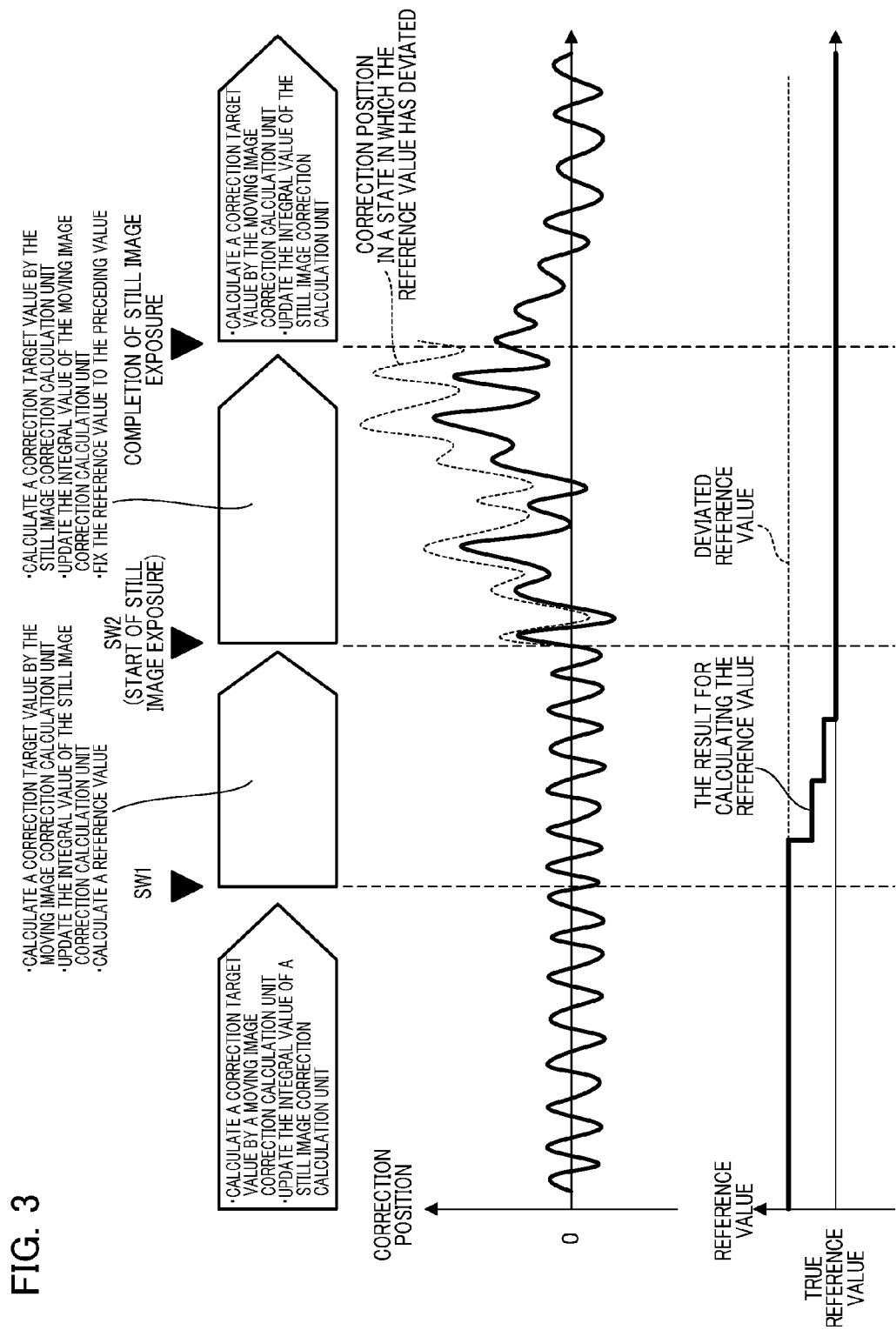
FIG. 3 is a diagram that explains an operation of an image shake correction device while shooting still images.

FIG. 3 is a diagram that explains an operation of the image shake correction device while shooting still images. When the operation switch 140 is not pressed, that is, when the first switch (SW1) and the second switch (SW2) are both OFF, the moving correction amount calculation unit 113 calculates a correction amount, and the correction amount serves as the correction target value. Additionally, in this state, the moving image correction amount that has been calculated is rewritten as the filter calculation intermediate value of the integrator 124 of the still image correction amount calculation unit 114.

Next, while the operation switch 140 is being pressed halfway, that is, when the first switch (SW1) is ON and the second switch (SW2) is OFF, the moving image correction amount calculation unit 113 calculates a correction amount, and the correction amount serves as the correction target value. Additionally, at the same time, the moving image correction amount that has been calculated is rewritten as a filter calculation intermediate value of the integrator 124 of the still image correction amount calculation unit 114. Further, the reference value calculation unit 115 calculates a reference value from a filter calculation intermediate value of the HPF 120, and based on the calculation result, the reference value is corrected by the reference value correction unit 116.

Next, while the operation switch 140 is being pressed all the way down, in other words, when the first switch (SW1) is OFF and the second switch (SW2) is ON, the correction amount calculation is switched to the correction of still images, the still image correction amount calculation unit 114 calculates the correction amount, and the correction amount serves as the correction target value. Additionally, in this state, that is, during the exposure of the still image, the still image correction amount that has been calculated is rewritten as the filter calculation intermediate value of the integrator 121 of the moving image correction amount calculation unit 113. Further, the reference value calculation is not performed, and the reference value immediately before the SW2 is ON, in other words, the reference value that was calculated when the SW1 was ON is not updated.

Next, when the complete-pressing of the operation switch 140 is released, that is, when the first switch (SW1) and the second switch (SW2) are both returned to OFF, the moving image correction amount calculation unit 113 calculates a correction amount, and the correction amount serves as the correction target value. At the same time, the moving image correction amount that has been calculated is rewritten as the filter calculation intermediate value of the integrator 124 of the still image correction amount calculation unit 114.

Figure 4:
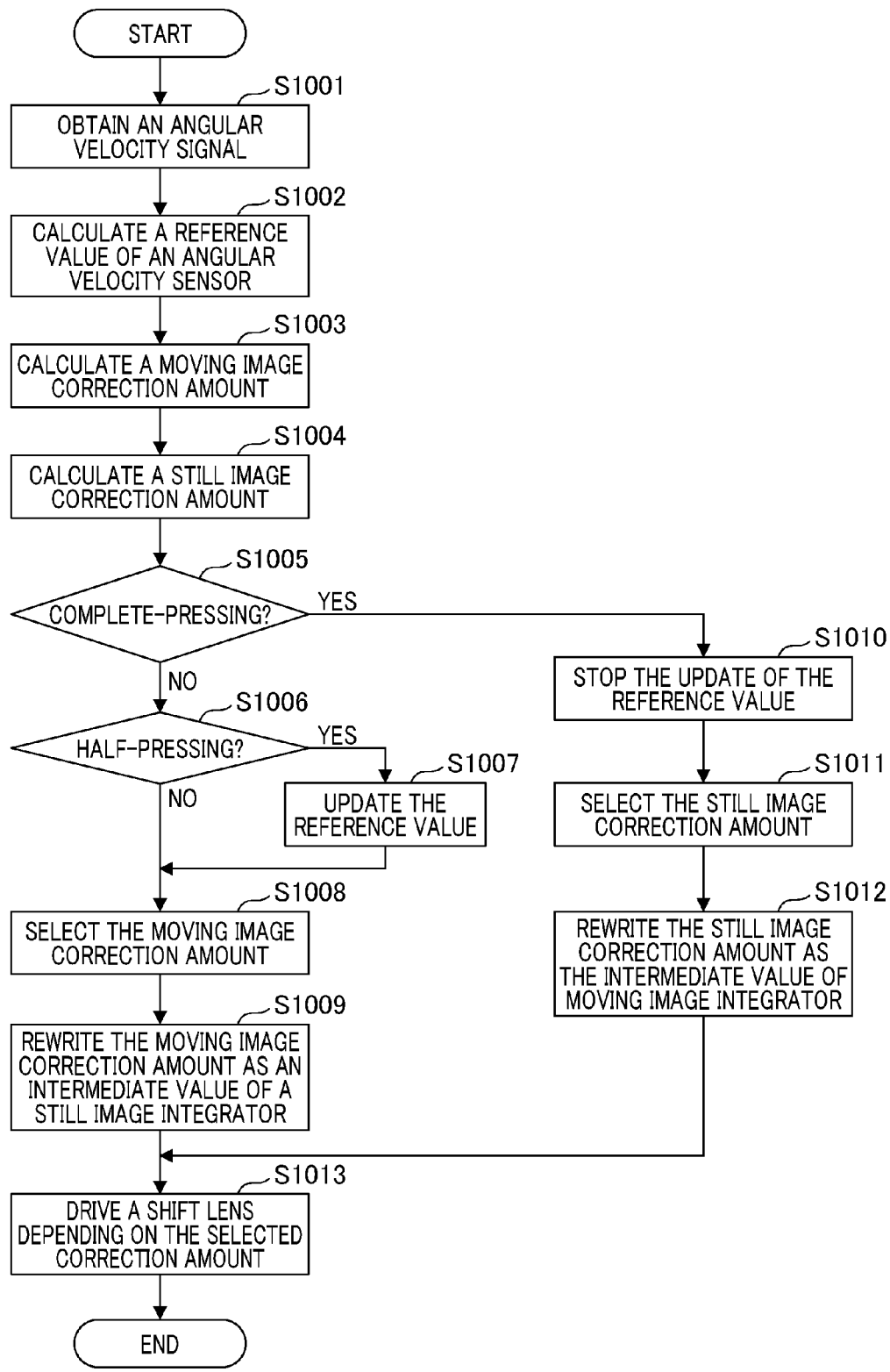
FIG. 4 is a diagram that explains calculation processing of a correction amount for moving images and still images.

FIG. 4 is a flowchart that explains the calculation processing of the correction amount for still images and the moving images in the embodiment 1. The process shown in FIG. 4 is processed in a home computer. Note that the process shown in FIG. 4 is repeatedly executed at any predetermined cycle, for example, a capturing period of the angular velocity data by the A/D conversion.

In step S1001, the correction amount calculation unit 112 obtains the angular velocity signal from the angular velocity sensor 110. Subsequently, in step S1002, the reference value calculation unit 115 calculates a reference value of the angular velocity sensor 110 based on the intermediate value of the HPF 120. In step S1003, the moving image correction amount calculation unit 113 calculates the moving image correction amount.

Next, in step S1004, the still image correction amount calculation unit 114 calculates the still image correction amount. Subsequently, in step S1005, the correction amount calculation unit 112 determines whether or not the operation switch 140 is pressed all the way down. If the operation switch 140 is not pressed all the way down, the process proceeds to step S1006, and if it is pressed all the way down, the process proceeds to step S1010.

Next, in step S1006, the correction amount calculation unit 112 determines whether or not the operation switch 140 is pressed halfway. If the operation switch 140 is not pressed halfway, the process proceeds to step S1008, and if it is pressed halfway, the process proceeds to step S1007. In step S1007, the reference value calculation unit 115 updates the reference value if the reference value calculated in step S1002 has changed, and the process proceeds to step S1008.

In step S1008, the switching control unit 126 selects the moving image correction amount calculated in step S1003. In step S1009, the switching control unit 126 rewrites the selected moving image correction amount as the filter calculation intermediate value of the still image integrator 124. The process then proceeds to step S1013, and the shift lens is driven according to the selected correction amount.

In step S1010, the reference value calculation unit 115 stops the update of the reference value of the angular velocity sensor 110. In step S1011, the switching control unit 126 selects the still image correction amount that has been calculated in step S1004. In step S1012, the switching control unit 126 rewrites the selected still image correction amount as a filter calculation intermediate value of the video integrator 121. Subsequently, the process proceeds to step S1013, and the shift lens is driven and controlled according to the selected correction amount.

Note that in the above description, although a description was given of the case in which the lens shift optical image shake correction method is used as a shake correcting unit, the present invention is also applicable to other configurations. For example, it maybe possible to use a method using optical image shake correction methods other than the lens shift, for example, tilt lens drive and variable angle prism (VAP), or a sensor-shift optical correction method that corrects shaking by moving an imaging element on a plane perpendicular to the optical axis. Alternatively, it may be possible to use an electronic image shake correction method that changes a cutout position of the image in accordance with the shake correction amount after the image signal is buffered in a memory.

The image shake correction device in embodiment 1 calculates the reference value of the angular velocity sensor during the half-pressing of the still image shooting button. The image shake correction device then uses the calculation result for the reference value during the complete-pressing of the still image shooting button and rewrites the filter calculation intermediate value of the still image integrator during the calculation of the moving image correction amount with the moving image correction target value. Additionally, the image shake correction device rewrites the filter calculation intermediate value of the moving image integrator with the still image correction target value during the calculation of the still image correction amount. Accordingly, even if the shake signal processing method is switched between moving images and still images, it is possible to avoid discontinuity in the shake correction control and improve shake correction performance.

Second Embodiment

Figure 5:
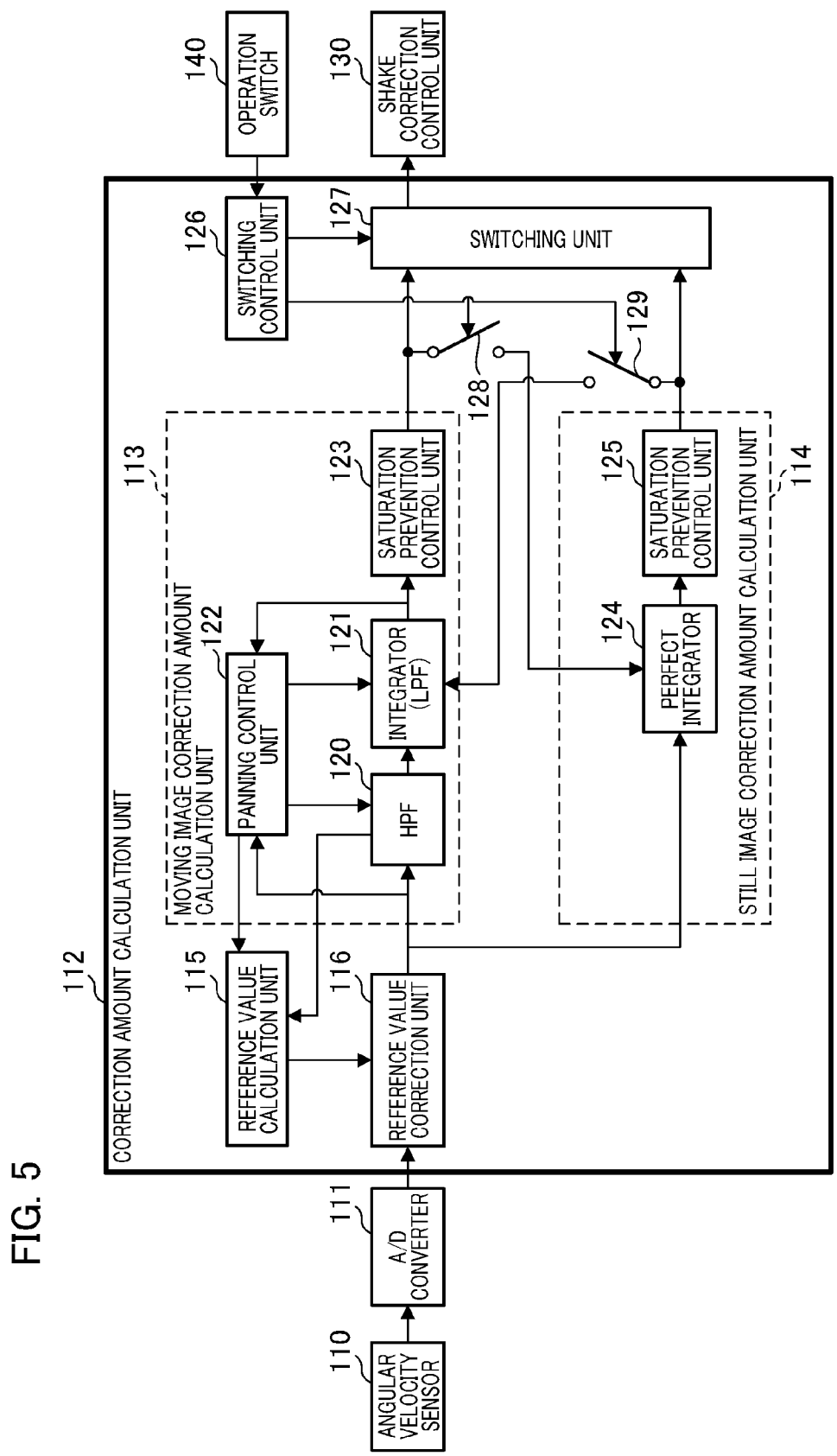
FIG. 5 illustrates a configuration of an imaging apparatus having the image shake correction device.

FIG. 5 illustrates a configuration of an imaging apparatus having an image shake correction device of embodiment 2. The configuration shown in FIG. 5 is different from that shown in FIG. 2 in the following point. The panning control unit 122 determines whether or not panning is being performed even when the operation switch 140 is being pressed halfway. If panning is being performed, the panning control unit 122 determines a follow shot is being performed and outputs a panning speed to the reference value calculation unit 115. If obtaining the panning speed from the panning control unit 122, the reference value calculation unit 115 sets a panning component as a reference value. That is, in the present embodiment, the panning control unit 122 functions as an operation detection unit that detects the shooting direction change operation, and the reference value calculation unit 115 uses the detection result for the shooting direction change operation, and calculates the reference value.

The panning control unit 122 can calculate the panning speed by any of the methods described below. As a first method, if the angular velocity sensor outputs a constant output with respect to the reference value, the panning control unit 122 determines that the angular velocity serves as the angular velocity of the panning. Moreover, as a second method, the panning control unit 122 detects a motion vector, determines that panning is being performed if the motion amount is moving at a constant speed, and calculates the panning speed based on the magnitude of the motion vector per unit time. Additionally, as another method, it is also possible to calculate the panning speed by using both of the angular velocity sensor and the motion vector described above, and comprehensively determining that the panning is being performed in each movement.

Figure 6:
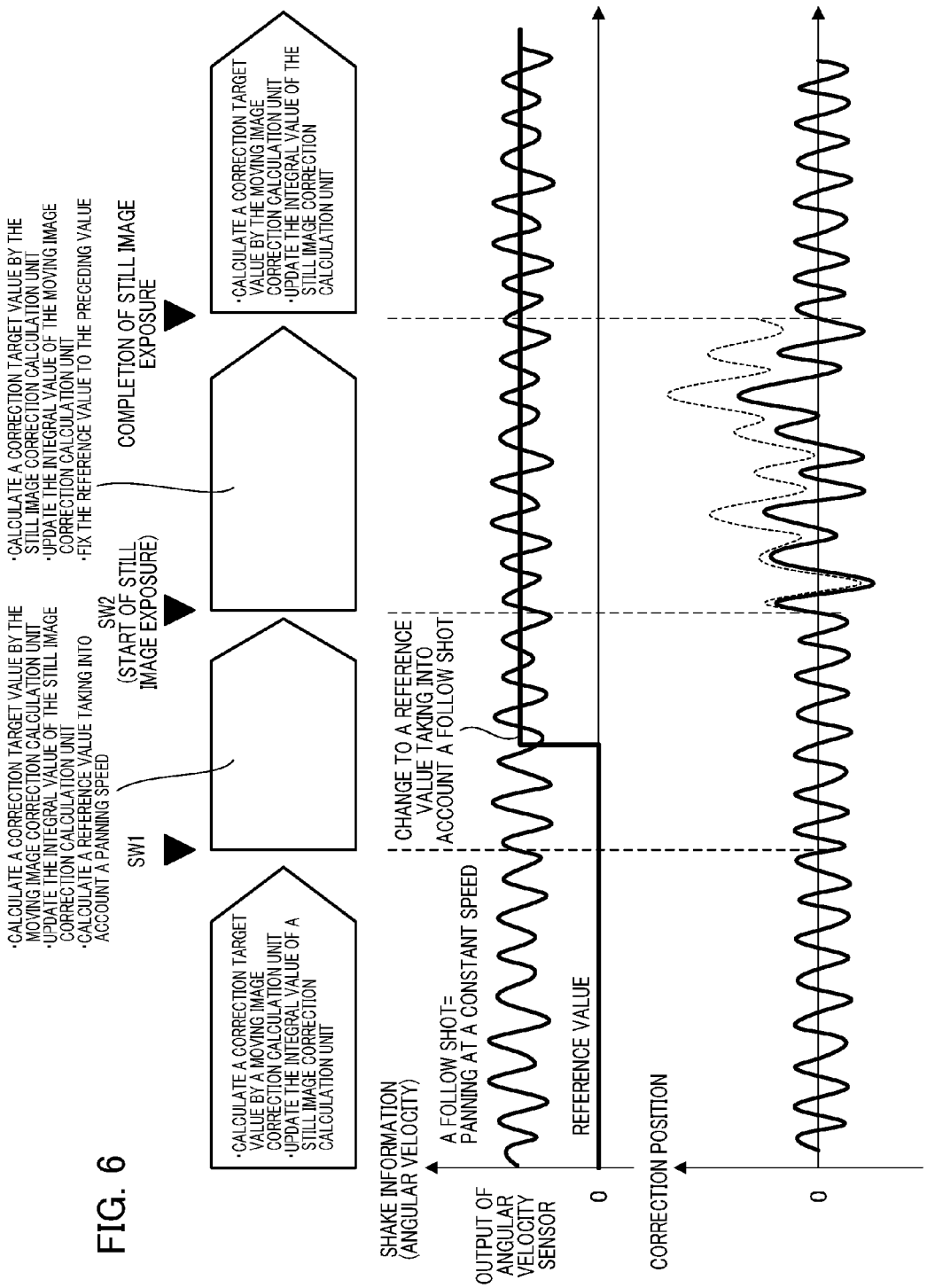
FIG. 6 is a diagram that explains an operation of the image shake correction device during a follow shot.

FIG. 6 is a diagram that explains the operation of the image shake correction device while performing a follow shot. First, when the operation switch 140 is not pressed, in other words, when the first switch (SW1) and the second switch (SW2) are both OFF, the moving image correction amount calculation unit 113 calculates the correction amount, and the correction amount serves as the correction target value. Additionally, in this state, the calculated moving image correction amount is rewritten as the filter calculation intermediate value of the integrator 124 of the still image correction amount calculation unit 114.

Next, when the operation switch 140 is pressed halfway, that is, when the first switch (SW1) is ON and the second switch (SW2) is OFF, the moving image correction amount calculation unit 113 calculates a correction amount, and the correction amount serves as the correction target value. Additionally, at the same time, the calculated moving image correction amount is rewritten as the filter calculation intermediate value of the integrator 124 of the still image correction amount calculation unit 114. Further, the reference value calculation unit 115 calculates the reference value by taking into account the output of the angular velocity sensor 110 obtained from the panning control unit 122 (panning speed), and based on the calculation result, the reference value correction unit 116 corrects the reference value.

Next, when the operation switch 140 is pressed all the way down, in other words, when the first switch (SW1) is OFF and the second switch (SW2) is ON, the correction amount calculation is switched to the correction of still images and the still image correction amount calculation unit 114 calculates the correction amount, and the correction amount serves as the correction target value. Additionally, in this state, that is, during the exposure of the still image, the calculated still image correction amount is rewritten as the filter calculation intermediate value of the integrator 121 of the moving image correction amount calculation unit 113. At this time, the reference value calculation is not performed, and the reference value immediately before the SW2 is ON, in other words, the reference value that was calculated when the SW1 was ON is not updated. This reference value includes a panning speed component of the follow shot.

Finally, when the complete-pressing of the operation switch 140 is released, that is, when the first switch (SW1) and the second switch (SW2) are both returned to OFF, the moving image correction amount calculation unit 113 calculates a correction amount, and the correction amount serves as the correction target value. Additionally, at the same time, the calculated moving image correction amount is rewritten as the filter calculation intermediate value of the integrator 124 of the still image correction amount calculation unit 114.

FIG. 7 is a flowchart that explains the calculation processing of the correction amount for the still images and the moving images in the embodiment 2. Step S2001, and steps S2003 through S2013 are similar to step S1001, and steps S1003 through S1013.

In step S2002 of FIG. 7, the reference value calculation unit 115 calculates the reference value of the angular velocity sensor taking into account the panning speed. Specifically, if the panning speed is obtained from the panning control unit 122, the reference value calculation unit 115 sets the panning component as the reference value.

The image shake correction device in the embodiment 2 calculates the reference value of the angular velocity sensor taking into account the panning speed in the follow shot during the half-pressing of the still image shooting button. Subsequently, it uses the calculation result for the reference value during the complete-pressing of the still image shooting button, and rewrites the filter calculation intermediate value of the still image integrator with the moving image correction target value during the calculation of the moving image correction amount. Additionally, during the calculation of the still image correction amount, it rewrites the filter calculation intermediate value of the moving image integrator with the still image correction target value. Therefore, even if the shake signal processing method is switched between moving images and still images, it is possible to avoid discontinuity in the shake correction control and improve the shake correction performance while performing a follow shot.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-050179, filed Mar. 13, 2015, which is hereby incorporated by reference wherein in its entirety.

What is claimed is:

1. An image shake correction device that controls a shake correction unit and corrects an image shake of a captured image comprising:
   a first calculation unit configured to calculate a first correction amount used for correcting the image shake while shooting moving images based on a shake detection signal;
   a second calculation unit configured to calculate a second correction amount used for correcting the image shake while shooting still images based on the shake detection signal, and
   a control unit configured to select a correction amount to be used for correcting the image shake from either the first correction amount or the second correction amount and execute control in which an intermediate calculation value of the calculation unit corresponding to the correction amount that has not been selected from either the first calculation unit or the second calculation unit, is updated based on the correction amount that has been selected.

2. The image shake correction device according to claim 1, wherein, if the still image is not being exposed, the control unit selects the first correction amount as a correction amount to be used for correcting the image shake and updates an intermediate calculation value of the second calculation unit with the first correction amount.

3. The image shake correction device according to claim 1, wherein, if the still image is being exposed, the control unit selects the second correction amount as a correction amount used for correcting the image shake and updates an intermediate calculation value of the first calculation unit with the second correction amount.

4. The image shake correction device according to claim 1 comprising:
   a third calculation unit configured to calculate a reference value of the shake detection signal; and
   a signal correction unit configured to correct the shake detection signal by using the reference value,
   wherein the first calculation unit calculates the first correction amount based on the corrected shake detection signal, and the second calculation unit calculates the second correction amount based on the corrected shake detection signal.

5. The image shake correction device according to claim 4, wherein the first calculation unit includes a high pass filter and an integrator, and
   wherein the second calculation unit includes an integrator.

6. The image shake correction device according to claim 5, wherein the third calculation unit calculates and sets the reference value based on the calculation result for the high pass filter included in the first calculation unit.

7. The image shake correction device according to claim 4, wherein, while exposing still images, the third calculation unit does not update the reference value that has been set.

8. The image shake correction device according to claim 6 comprising:
   an operation detection unit configured to detect shooting direction change operation,
   wherein the third calculation unit calculates the reference value by using the detection result for the shooting direction change operation.

9. An optical apparatus including an image shake correction device that controls a shake correction unit and corrects an image shake of a captured image,
   wherein the image shake correction device comprises:
   a first calculation unit configured to calculate a first correction amount used for correcting the image shake while shooting moving images based on a shake detection signal;
   a second calculation unit configured to calculate a second correction amount used for correcting the image shake while shooting still images based on the shake detection signal, and
   a control unit configured to select a correction amount to be used for correcting the image shake from either the first correction amount or the second correction amount and execute control in which an intermediate calculation value of the calculation unit corresponding to the correction amount that has not been selected from either the first calculation unit or the second calculation unit, is updated based on the correction amount that has been selected.

10. An imaging apparatus including an image shake correction device that controls a shake correction unit and corrects an image shake of a captured image, and an imaging element,
    wherein the image shake correction device comprises:
    a first calculation unit configured to calculate a first correction amount used for correcting the image shake while shooting moving images based on a shake detection signal;
    a second calculation unit configured to calculate a second correction amount used for correcting the image shake while shooting still images based on the shake detection signal, and a control unit configured to select a correction amount to be used for correcting the image shake from either the first correction amount or the second correction amount and execute control in which an intermediate calculation value of the calculation unit corresponding to the correction amount that has not been selected from either the first calculation unit or the second calculation unit, is updated based on the correction amount that has been selected.

11. A control method of an image shake correction device that controls a shake correction unit and corrects an image shake of a captured image comprising:

calculating, by a first calculation unit, a first correction amount used for correcting the image shake while shooting moving images based on a shake detection signal;

calculating, by a second calculation unit, a second correction amount used for correcting the image shake while shooting still images based on the shake detection signal, and selecting, by a control unit, a correction amount to be used for correcting the image shake from either the first correction amount or the second correction amount and executing control in which an intermediate calculation value of the calculation unit corresponding to the correction amount that has not been selected from either the first calculation unit or the second calculation unit, is updated based on the correction amount that has been selected.

* * * * *